Nov. 26, 1957   J. W. MOMBERG   2,814,747
STREAMLINED COMPOSITE GEAR HOUSINGS AND END-COVERS
FOR ELECTRIC OSCILLATING FANS
Filed July 5, 1955

INVENTOR.
James W. Momberg
BY
ATTORNEY

United States Patent Office 2,814,747
Patented Nov. 26, 1957

2,814,747

STREAMLINED COMPOSITE GEAR HOUSINGS AND END-COVERS FOR ELECTRIC OSCILLATING FANS

James W. Momberg, Somerville, N. J., assignor to The Singer Manufacturing Company, Elizabeth, N. J., a corporation of New Jersey Application July 5, 1955, Serial No. 519,797

5 Claims. (Cl. 310—258)

This invention relates to electric fans of the oscillating type and more particularly to structure therefor in which a single die-cast end-cover having streamlined external contours supports and houses a bearing for the motor and a gear-reduction drive for the oscillating mechanism.

In the prior art it has been customary either to form the gear housing separately from the motor end-cover or, in those cases where a composite housing is used, a separate cover is required to provide a streamlined effect for eye appeal and efficient air flow. This prior construction has been brought about by the apparent necessity of assembling the gears in the housing through a large aperture made in the external wall, which aperture must later be closed by a cover. Under these circumstances, it is difficult to make a single casting with smooth external contours, so resort has been made to the use of a functional casting with a separate sheet-metal cover or cowl to provide the streamlining effect.

This extra structure is rendered unnecessary by the construction according to this invention in which the aperture in the gear housing to admit the gears for assembly is made in an internal wall and provides an opening facing towards the interior of the motor housing, which opening is closed after gear assembly, by a pre-assembled cartridge-type bearing in which is journaled one end of the motor shaft.

It is therefore a primary object of this invention to provide in electric fans of the oscillating type a single die-cast element which serves as a composite motor end-cover, gear housing and streamlined cowl and thereby to reduce assembly time and expense by dispensing with the need for extra contour-shaping elements.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
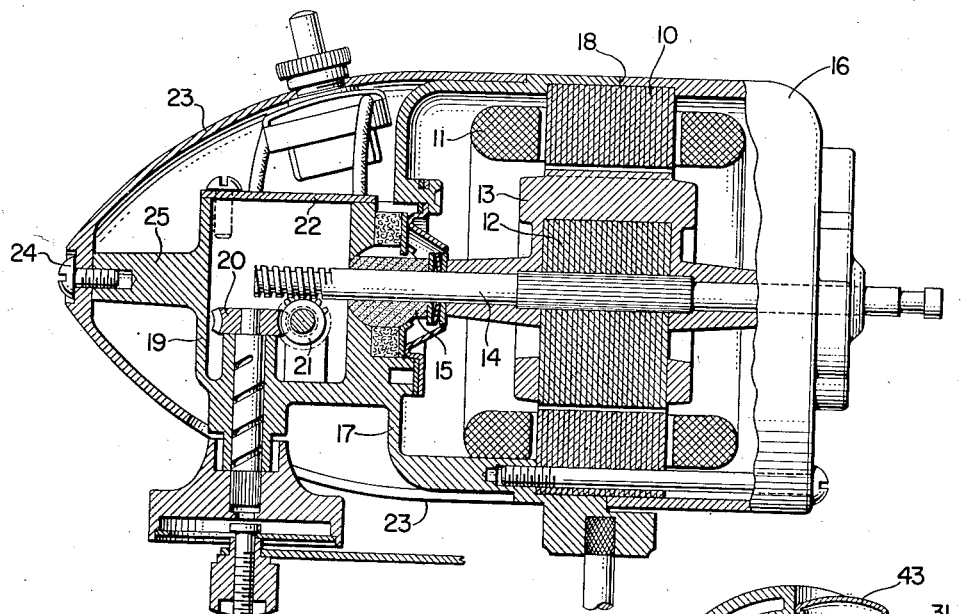
Fig. 1 is a longitudinal sectional view taken through an electric fan showing the present state of the prior art.
Figure 3:
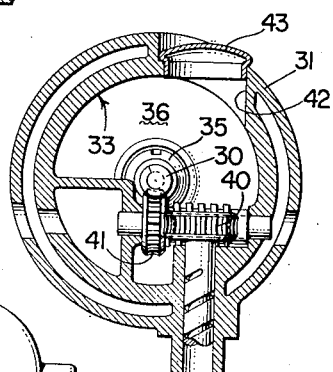
Fig. 3 is a transverse sectional view taken substantially on line 3—3 of Fig. 2.

Referring now to the prior art structure of Fig. 1, 10 denotes a stator core carrying a winding 11. A rotor core 12 is provided with cast bars 13 and a shaft 14. The shaft 14 is journaled in bearings 15 carried in respective end-covers 16 and 17 which are joined together along a transverse split line 18 to form a housing for the motor. The end-cover 17 is formed with a gear-housing portion 19 which is open to the exterior of the motor housing to permit gears 20 and 21 to be assembled therein after which it is closed by a flat cover plate 22. To cover the irregular surface contours of the end-cover 17, a separate streamlined cover 23 is fitted over said end-cover 17 and is secured thereon by a screw 24 tapped into a boss 25 formed on the gear-housing portions. It will be noted that, with this construction, two extra covers, viz. 22 and 23 are necessary in the production of a smooth streamlined exterior.

Figure 2:
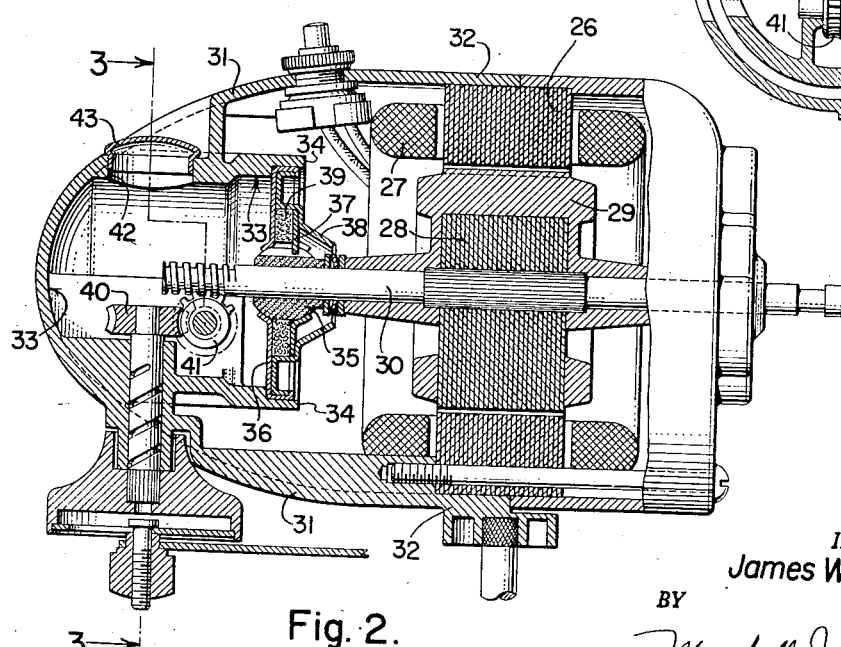
Fig. 2 is a longitudinal sectional view taken through an electric fan embodying the present invention.

Turning now to Fig. 2, which illustrates an embodiment of this invention, 26 denotes a stator core with a winding 27. A rotor core 28 is provided with cast bars 29 and a shaft 30. A cup-shaped end-cover 31 is formed, preferably by die-casting, with an open end portion 32 which contains part of the stator core. Cast integrally with the inner wall of the end-cover 31 is an internal cylindrical recess 33 having an end portion 34 open to the interior of the motor housing and providing an access aperture through which the reduction gears 40 and 41 may be assembled in place.

A closure element in the form of a built-up bearing assembly structure comprising a bushing 35, a seat 36, a cover 37, a retainer 38 and a felt washer 39 is known as a cartridge type bearing and is seated in the recess to form a closure for the gear housing and preferably to provide means for journaling the shaft 30 which reaches within the housing to drive the gearing.

An external apertured portion 42 with a pressed-on cover 43 need be only large enough to accept the worm-wheel 40 and thus the external surface of the end-cover may be formed with substantially unbroken contours to provide an inherent streamlined effect without the need for extra contour-shaping elements. The apertured portion 42 is also useful in making the gear housing accessible for lubrication.

It is evident from the above that the use of the cartridge bearing as the closure for a gear housing having its major access aperture opening into the interior of the motor frame provides a simple inexpensive assembly of only two end-covers to form a complete motor housing functioning as a bearing support, a gear housing and a smooth-surfaced cowl for eye appeal and efficient air flow.

Various modifications may be made in the device embodying my invention without departing from the spirit and scope thereof, and I desire, therefore, that only such limitations shall be placed thereon as imposed by the prior art and the appended claims.

Having thus described the nature of the invention, what I claim herein is:

1. In a fan-driving mechanism, an electric motor having a stator and a rotor, a cast end-cover for said motor formed with an open end for receiving part of said stator, a cup-shaped portion cast integrally within the end-cover and having an open end facing in the same direction as the open end of the end-cover, a cartridge-type bearing seated in said cup-shaped portion to form therewith a housing, reduction gearing located within said housing, and a shaft secured to said rotor and journaled in said bearing to drive said reduction gearing.

2. In an electric fan of the oscillating type, an electric motor having a stator and a rotor, a cast end-cover for said motor formed with an open end for receiving part of said stator, an annular wall portion cast integrally within the end cover to form a cup having an open end facing in the same direction as the open end of the end-cover and forming an assembly access opening for reduction gearing located within said cup, a cartridge-type bearing received in said cup to form a closure therefor, and a shaft secured to said rotor and journaled in said bearing to drive said reduction gearing.

3. In an electric fan of the oscillating type, an electric motor having a stator and a rotor, a cast end-cover having a smooth exterior and a general cup shape with the stator received in the mouth of the cup, a second and smaller cup formed integrally with and within said end-cover and having a mouth portion facing inwardly toward the stator, a cartridge-type bearing received in the mouth portion of said second cup, a shaft secured to the rotor and journaled in said bearing, and reduction gearing driven by said shaft, received for assembly in said inner cup through the mouth thereof.

4. In an electric fan, an electric motor having a stator and a rotor, a housing for said stator comprising end-covers joined in edge-to-edge engagement along a transverse plane, one of said end-covers being formed with an internal cup portion having an open end facing the interior of the housing, reduction gearing received through the open end for assembly within the cup portion, a cartridge bearing seated in said open end for closing said cup portion, and a shaft secured to the rotor and journaled in said cartridge bearing to drive the reduction gearing.

5. In an electric fan of the oscillating type, an electric motor having a stator and a rotor, cup-shaped end-covers placed in edge-to-edge engagement to form a housing to support the stator and rotor, one of said end-covers having an internal recess formed by walls defining a hollow cylinder opening to the interior of the housing and having its axis in line with the rotor axis, a pre-assembled cartridge-type bearing fitted within the recess opening to form a closed gear housing, reduction gearing disposed within said gear housing, and a shaft secured to said rotor, journaled in said bearing and extending within the gear housing to drive the reduction gearing.

References Cited in the file of this patent

UNITED STATES PATENTS 1,196,256     McEwen _____ Aug. 29, 1916